(12) United States Patent
Van Ginkel

(10) Patent No.: US 8,028,784 B1
(45) Date of Patent: Oct. 4, 2011

(54) TRAILER WITH SLIDING AXLE

(76) Inventor: Larry E. Van Ginkel, Hull, IA (US)

( * ) Notice: Subject to any disclaimer, the term of this patent is extended or adjusted under 35 U.S.C. 154(b) by 241 days.

(21) Appl. No.: 12/277,717

(22) Filed: Nov. 25, 2008

(51) Int. Cl.
*B62D 53/10* (2006.01)

(52) U.S. Cl. .................. 180/209; 280/149.2; 280/405.1

(58) Field of Classification Search .................. 180/209; 280/149.2, 407.1, 405.1
See application file for complete search history.

(56) References Cited

U.S. PATENT DOCUMENTS

| | | | |
|---|---|---|---|
| 5,480,171 A | 1/1996 | Cheffey | |
| 5,564,725 A | 10/1996 | Brazeal | |
| 5,813,682 A * | 9/1998 | Stevens | 280/149.2 |
| 6,155,625 A * | 12/2000 | Felix | 296/37.14 |
| 6,439,814 B1 * | 8/2002 | Floe | 410/7 |
| 6,964,427 B2 * | 11/2005 | Chumley | 280/491.3 |
| 7,077,411 B2 | 7/2006 | Peters et al. | |
| 7,163,220 B2 | 1/2007 | Pappas | |
| 7,207,593 B2 | 4/2007 | Saxon et al. | |
| 7,261,177 B2 | 8/2007 | Eckelberry | |
| 7,303,200 B2 | 12/2007 | Ramsey | |
| 2005/0218646 A1 * | 10/2005 | Ramsey | 280/788 |
| 2007/0216147 A1 | 9/2007 | Ramsey | |

* cited by examiner

*Primary Examiner* — Paul N Dickson
*Assistant Examiner* — Timothy Wilhelm
(74) *Attorney, Agent, or Firm* — McKee, Voorhees & Sease, P.L.C.

(57) ABSTRACT

A trailer is provided with a bed and a slidably adjustable axle assembly. The bed includes a frame with left and right, inverted U-shaped channels. The axle assembly includes left and right rails upon which the channels are slidably mounted. Pins extend through the channels, but not through the rails, to limit sliding movement of the bed relative to the axle assembly. The pins are inserted into the channels with a twist lock action under spring bias. Lock members are provided to prevent accidental removal of a pin from the channel during travel.

16 Claims, 4 Drawing Sheets

TRAILER WITH SLIDING AXLE

BACKGROUND OF THE INVENTION

Trailers having sliding axles are known. For example, over the road semi trucks with a tractor and trailer often have a sliding axle assembly for the trailer which can be adjusted depending upon the weight of the load in the trailer. Such sliding axle assemblies have a channel on the trailer which slides over a rail on the axle and is secured in a selected position by a plurality of pins extending through the channel and rail on each side of the axle assembly. The pins typically are hydraulically actuated so as to be simultaneously pulled out of engagement from the channels and frames before the trailer is slid on the axle assembly. Once the desired axle position is reached, the pins are hydraulically re-inserted through the channels and rails to lock the trailer and axle assembly in the selected position. Linkage extends between the pins for simultaneous actuation. The hydraulics and linkages adds to the complexity and cost of such sliding axles.

Therefore, a primary objective of the present invention is the provision of an improved trailer having a simplified sliding axle assembly.

Another objective of the present invention is the provision of a trailer with a sliding axle assembly which can be quickly and easily adjusted.

A further objective of the present invention is the provision of a trailer with a sliding axle and having manually set stoppers or pins to limit the movement of the trailer bed relative to the axle.

A further objective of the present invention is the provision of a trailer with a sliding axle wherein the stopper pins extend only through the channel for abutment by the ends of the axle rails.

Another objective of the present invention is the provision of a sliding axle trailer which can be adjusted in six inch increments.

Yet another objective of the present invention is the provision of a trailer with a sliding axle having pins which are spring biased to preclude accidental disengagement of the pins.

A further objective of the present invention is the provision of an improved trailer for towing behind a vehicle having a flat panel connected to the front of the trailer bed which is moveable between a raised wind deflector travel position and a lowered ramp or loading position for moving objects to and from the bed.

Still another objective of the present invention is the provision of an improved trailer for towing behind a vehicle having a bed with a recessed spare tire compartment beneath the floor of the bed.

Another objective of the present invention is the provision of an improved trailer for towing behind a vehicle having longitudinally extending slots to receive tie down straps to anchor an object to the bed.

Another objective of the present invention is the provision of a method of adjusting an axle assembly on a trailer by setting a brake on the trailer, and moving a tow vehicle hooked to the trailer forwardly or rearwardly so that the trailer bed slides along axle rails until a forward or rearward end of the rails engages a stopper extending through a channel on the bottom of the bed.

A further objective of the present invention is the provision of an improved trailer having a slidable axle which is economical to manufacture and durable in use.

These another objectives will become apparent from the following description of the invention.

SUMMARY OF THE INVENTION

The improved trailer of the present invention is adapted to be hitched to a tow vehicle, and includes a bed and an axle assembly with wheels and brakes. The axle assembly includes a pair of upper, longitudinally extending rails, with one rail located on each side of the trailer. The bed of the trailer includes a pair of inverted, U-shaped channels on the bottom of the bed which slidably or rollably mount onto the rails. The channels have a plurality of holes at the forward and rearward ends to receive pins extending through each of the channels beyond the ends of the rails. The pins limit the sliding movement of the channels on the rails. The holes allow for adjustment of the axle relative to the bed in six inch increments.

In the inventive method of adjusting the axle assembly on the trailer, first, the electric trailer brake is set, and pins are inserted through the channels on opposite sides of the trailer in a selected hole at either the forward or rearward end, depending on which way the bed will be moved upon the axle. The tow vehicle then moves forwardly or rearwardly until the rails engage the pins to stop the sliding movement of the bed relative to the axle. Pins are then inserted through a hole in the channels adjacent the opposite end of the rails to preclude movement of the bed in either direction relative to the axle.

DETAILED DESCRIPTION OF THE PREFERRED EMBODIMENT

Figure 1:
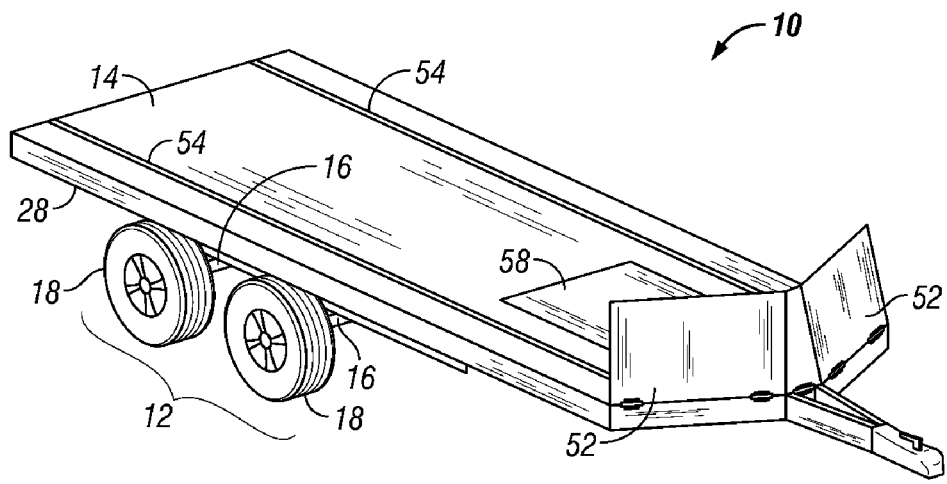
FIG. 1 is a side elevation view showing the trailer axle in a rear position and showing the front panels in a raised wind-deflector position.

The improved sliding axle trailer according to the present invention is generally designated in the drawings by the reference numeral 10. The trailer includes an axle assembly 12 and a bed 14. The axle assembly 12 is shown to have dual axles 16, though it is understood that the trailer 10 may have a single axle or triple axles depending upon the intended use of the trailer. The axle assembly 12 also includes wheels 18 and leaf springs 20.

A pair of left and right rails 22 is mounted to the ends of the leaf springs 20 in any convenient manner. In the dual axle assembly 12 shown in the drawings, the rails 22 are connected to the ends and midpoint of the leaf springs 20 with mounting brackets 24. Each end of the rails includes a horizontal tab or tongue 26.

The bed 14 includes a floor 28 supported on a frame 30. The frame 30 includes front and rear, left and right channels 32 having an inverted U-shape. A low friction insert 34 is fixed inside the channel 32 in any convenient manner, such as, adhesive, countersunk fasteners, or the like. The channels 32 nest onto the rails 22 for adjustable sliding movement along the rails 22. As an alternative to the insert 34, bearings may be provided between the rails 22 and the channels 32 so that the channels roll along the rails to a selected position.

Each channel 32 includes a plurality of holes 36 extending through the sidewalls of the channel. Preferably, the holes 32 are spaced at six inch intervals, though other intervals may be used. The holes on the opposite sidewalls of each channel 32 are aligned so as to receive a pin 38 which functions as a stop element to limit the sliding movement of the bed 14 relative to the axle assembly 12.

The pins 38 may take various forms without departing from the scope of the invention. In a preferred form, each pin 38 includes leg 40 which can be easily grasped by a person, and an arm 42 insertable in the holes 36 of the channels 32. Preferably, a spring 44 is provided on the arm 42 of each pin 38. Each pin 38 also includes an upstanding finger 46 which is adapted to be received in a lock tab 48 extending laterally outwardly on the outer sides of each channel 32. The lock tab 48 includes a notch or slot 50 to receive the finger 46 of the pin 38. A plurality of lock tabs 48 are provided, with one lock tab corresponding to each of the holes 36 on the channels 32. The locking function of the tabs may also be achieved with structure other than the tabs 48. For example, the holes 36 may be keyed, with the pins 38 being inserted with a twist lock action for retention.

In use, the position of the bed 14 relative to the axle assembly 12 can be adjusted, even when the trailer 10 is fully loaded, so as to distribute the weight for the best towing and ride. Sliding the axles 16 forwardly will decrease tongue weight and increase trailer axle weight. Conversely, when the axles 16 are slid rearwardly, the tongue weight will increase and the trailer axle weight will decrease. Adjusting the tongue weight will improve trailer towing and vehicle ride.

Figure 4:
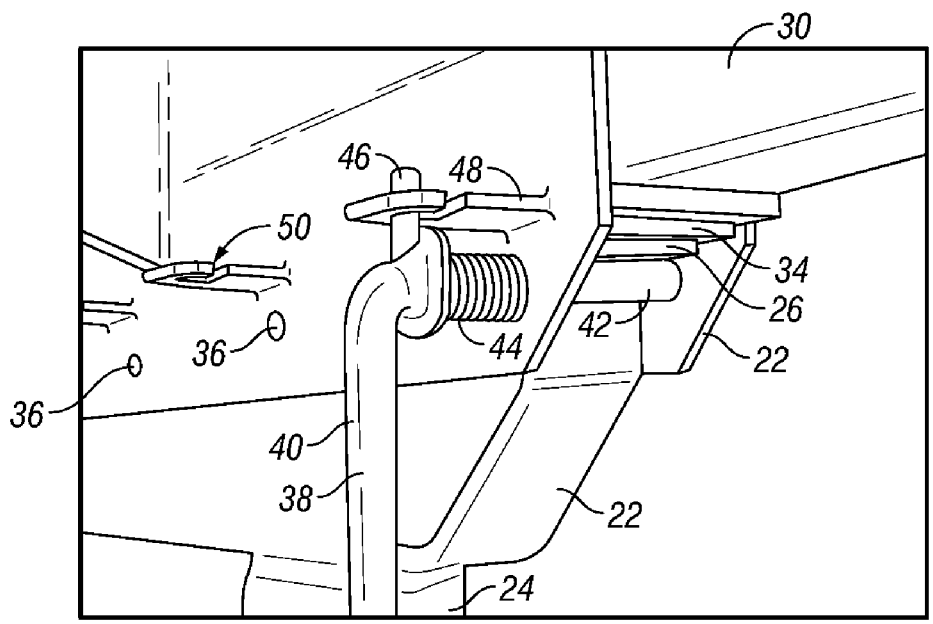
FIG. 4 is an enlarged perspective view of the channel and rail structures.
Figure 5:
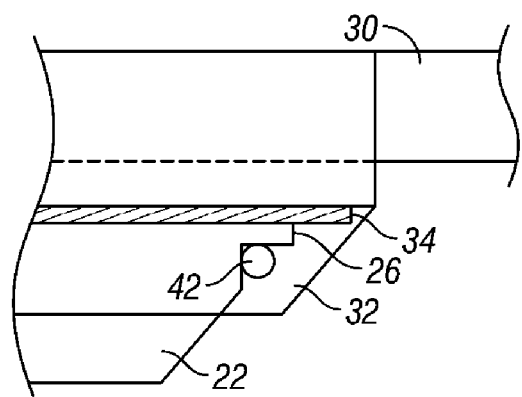
FIG. 5 is an enlarged elevation view of the channel and rail structures.

To adjust the position of the axle 16 relative to the bed 14, the pins 38 are removed from the channels 32. If the axle 16 is to be moved forwardly, a pair of pins 38 is inserted into a selected hole 36 in the front channels 32, but no pins 38 are inserted into holes in the rear channels. The trailer can include an electric brake which is then set, and the tow vehicle (not shown) is driven in reverse to slide the channels 32 and connected frame 30 of the bed 14 rearwardly relative to the axle assembly 12, until the forward ends of the rails 32 hit the front pins 38. As seen in FIGS. 4 and 5, the tabs 26 on the ends of the rails 22 will extend over the pins 38 and beneath the insert 34. After the movement of the bed 14 is complete, pins 38 can be inserted in holes 36 in the rear channels 32 adjacent the rear ends of the rails 22 so as to preclude sliding movement between the channels 32 and rails 22.

If the axles 16 are to be moved rearwardly relative to the bed 14, the pins 38 are removed, and then a pair of pins 38 are re-inserted into the selected holes 36 on the rear channels 32. The trailer brake is set, and the tow vehicle moves forwardly so as to pull the bed 14 forwardly relative to the axle assembly 12, until the rear ends of the rails 22 engage the rear pins 38 in the rear channels 32. Additional pins 38 are then inserted into the holes 36 in the front channels 32 adjacent the forward end of the rails 22 so as to preclude further movement of the bed 12 relative to the axles 16.

The pins 38 are inserted into the holes 36 with a twist-lock action, and compressing the spring 44 to position the finger 46 into the notch 50 of the lock tab 48. When the operator releases the pin 38, the spring 44 exerts a biasing force to retain the finger 46 in the lock tab 48 so that the pin 38 will not vibrate out of the channel 32 during travel. To remove the pins 38, an operator pushes each pin inwardly to compress the spring 44 and then turns the pin 38 to disengage the finger 46 from the notch 50 of the lock tab 48, whereby the pin 38 is free to pull out of the hole 36 of the channel 32.

The pins 38 do not extend through the rails 22, as in prior art trailers having slidable axles. The absence of holes in the rails 22 eliminates the need to align holes in the rails and channels, as in the prior art, thereby simplifying the insertion and removal of the pins 38 from the channels 32. Furthermore, the pins 38 provide a positive stop during the sliding movement of the channels 32 along the rails 22. The length of the rails 22 corresponds to the distance between respective sets of the holes 36 in the channels 32. More particularly, the rail length is slightly less than the distance between first holes, second holes, third holes, or forth holes in the front and rear channels 32.

Figure 2:
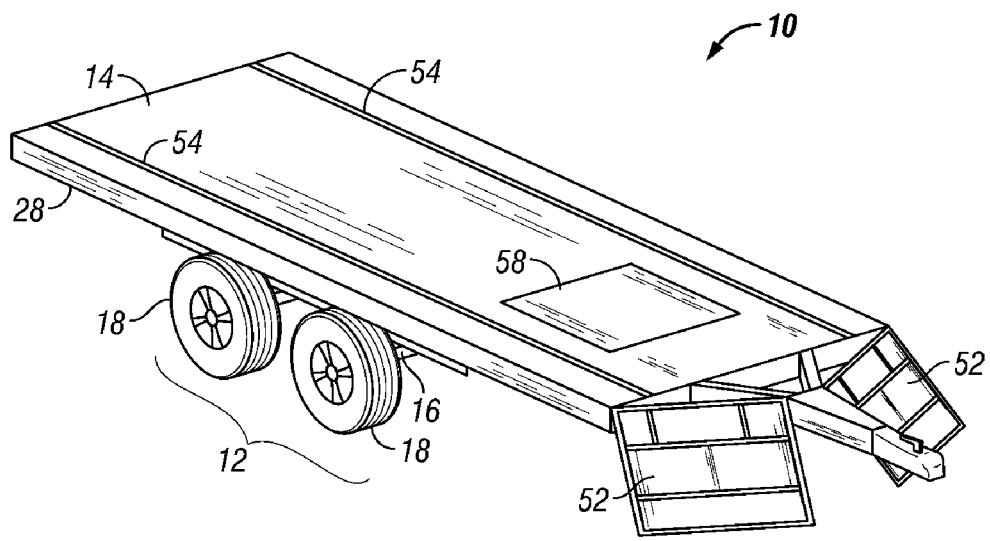
FIG. 2 is a view similar to FIG. 1 showing the trailer axle in a forward position and showing the front panels in a lowered ramp position.
Figure 3:
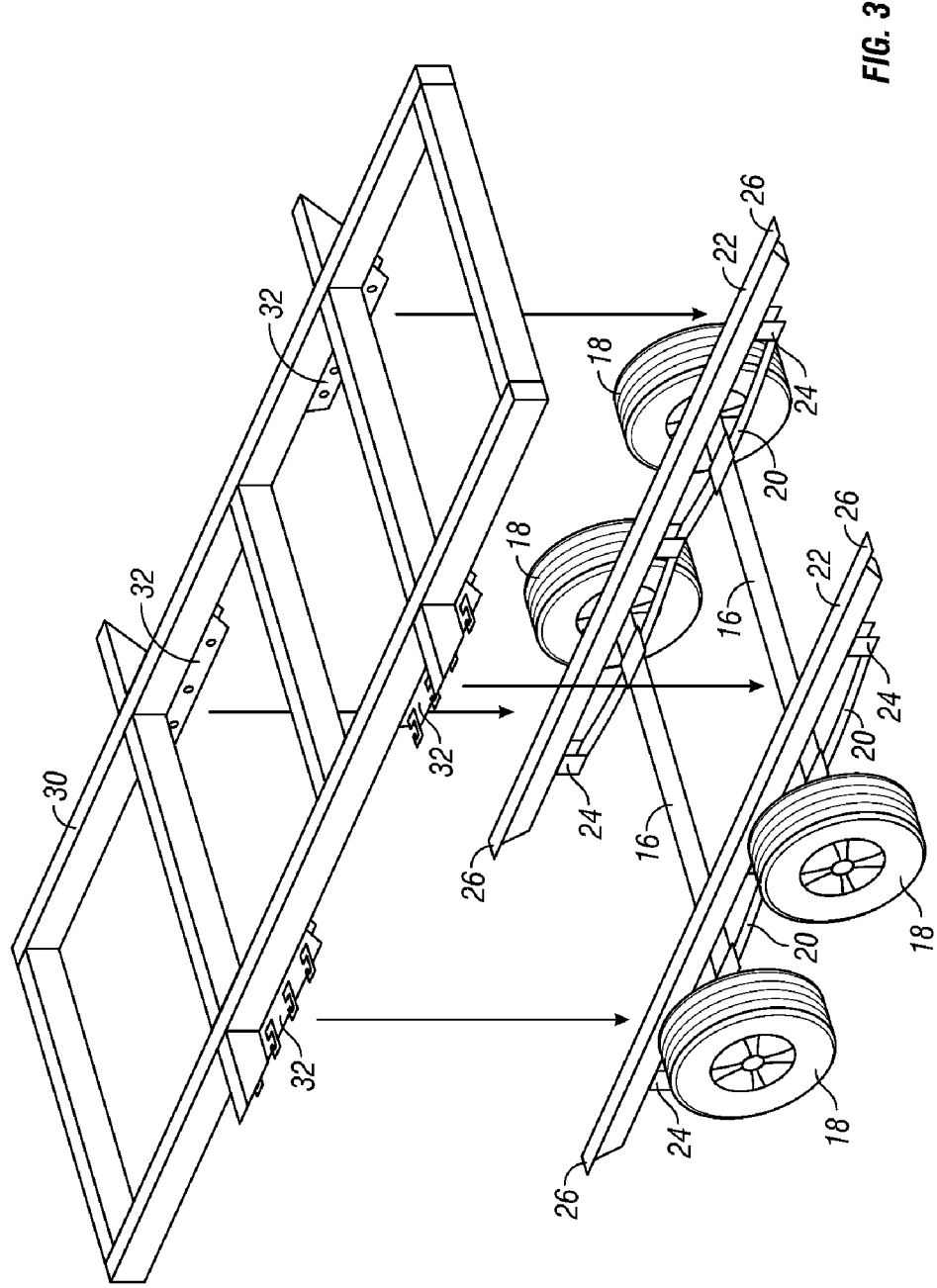
FIG. 3 is an exploded view of the trailer bed and axle assembly.

The trailer 10 includes several other unique features. First, the trailer includes front panels 52 which are pivotal between a raised travel position, as seen in FIG. 1, and a lowered ramp position shown in FIG. 2. In the raised position, the panels 52 function as a wind deflector during travel. In the lowered position, the panels 52 allow objects to be easily loaded and unloaded from the bed 14.

The bed 14 also includes a pair of spaced apart, longitudinally extending channels or slots 54 to receive hook ends on tie down straps or cables, such that the load can be anchored anywhere along the length of the bed 14. The channels 54 may include a plurality of transverse bars or pins (not shown) to which the hooks can be anchored.

Figure 6:
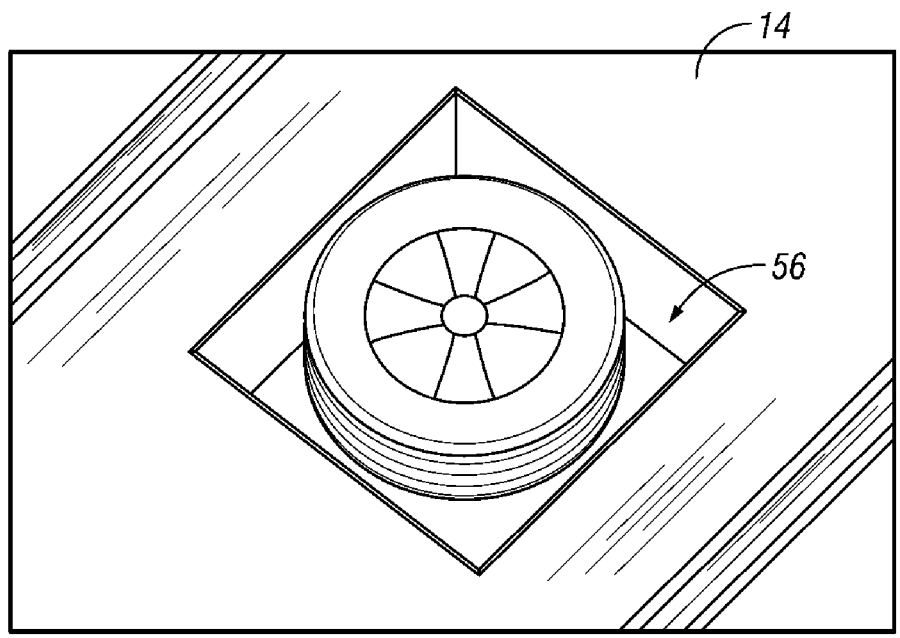
FIG. 6 is a view of the trailer showing the recessed spare tire compartment.

The trailer 10 also includes a recessed compartment 56, as seen in FIG. 6, to store a spare tire, tie down straps, and other articles. A door 58 is provided for covering the compartment 56. The door 58 is flush with the trailer bed 14 when positioned over the compartment 56. A handle may be provided on the door 58 for ease in removing the door. Alternatively, the door 58 may be hinged to the bed 14.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved trailer adapted to be hitched to a vehicle, and having wheels, an axle assembly extending between the wheels, a bed, and brakes, the improvement comprising:
    a pair of rails connected to the axle assembly on each side of the trailer;
    a pair of channels on the bottom of the bed to mount onto the rails for movement along the rails;
    pins extending through each of the channels beyond the ends of the rails to limit movement of the channels on the rails;
    each channel including a plurality of holes for selective receipt of the pins, and
    a plurality of stationary lock tabs extending from the channels and aligned with the holes to retain one of the pins in a selected hole.

2. The improved trailer of claim 1 wherein at least one of the pins extends through each channel while the channels slide on the rails.

3. The improved trailer of claim 1 wherein the pins includes a front pin and a rear pin for each rail.

4. The improved trailer of claim 1 wherein the pins are spring biased in position in the channels.

5. The improved trailer of claim 1 wherein the pins are twist locked into position in the channels.

6. The improved trailer of claim 1 wherein each channel is an inverted U-shaped member.

7. The improved trailer of claim 1 further comprising a substantially flat panel pivotally connected adjacent a front end of the bed to move between a raised wind deflector position and a lowered ramp position.

8. The improved trailer of claim 1 wherein the bed has a horizontal surface for supporting objects to be hauled on the trailer and a recess in the surface for storing a spare tire.

9. The improved trailer of claim 1 wherein the bed has a horizontal surface for supporting objects to be hauled on the trailer and a pair of longitudinally extending slots extending substantially the full length of the bed to which tie down members can be anchored.

10. The improved trailer of claim 1 wherein a different one of the lock tabs is associated with each hole.

11. The improved trailer of claim 1 wherein a set of the lock tabs is associated with each pin.

12. A trailer for towing behind a vehicle, comprising:
   an axle assembly with left and right rails each having forward and rearward ends;
   wheels on the axle assembly;
   a frame having an upper bed and lower left and right channels;
   the frame being mounted on the axle assembly with the channels mounted on the rails;
   front and rear stoppers selectively mounted in the channels to engage the forward and rearward ends of the rails when the frame is moved rearwardly or forwardly, respectively;
   the channels including a plurality of longitudinally spaced holes, and the stoppers each comprising a pin selectively inserted through one of the holes; and
   a plurality of longitudinally spaced stationary lock members on the channels, and the pins being spring biased for retention in one of the lock members.

13. The trailer of claim 12 further comprising plastic strips between the channels and the rails to minimize frictional forces during movement of the channels along the rails.

14. The trailer of claim 12 wherein each channel has a downwardly directed open face for receipt of the rail.

15. The trailer of claim 12 wherein a different one of the lock members is associated with each hole.

16. The trailer of claim 12 wherein a set of the lock members is associated with each pin.

\* \* \* \* \*